Figure 1:
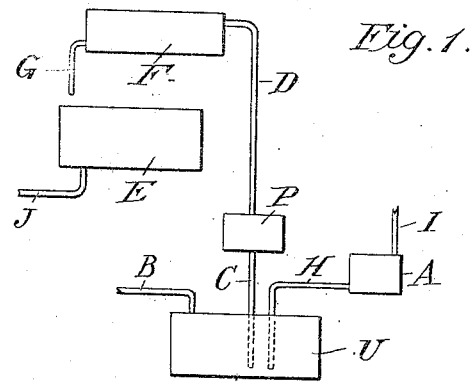

C. W. MERRILL.
PROCESS FOR PRECIPITATING HYDROMETALLURGICAL SOLUTIONS BY MEANS OF AN IMPROVED PRECIPITANT.
APPLICATION FILED JUNE 7, 1910.

1,006,866.

Patented Oct. 24, 1911.

Witnesses:
Edward Rowland
Charles Engel

Inventor
Charles W. Merrill
By his Attorney
Mead Parker Butler

UNITED STATES PATENT OFFICE.

CHARLES W. MERRILL, OF BERKELEY, CALIFORNIA.

PROCESS FOR PRECIPITATING HYDROMETALLURGICAL SOLUTIONS BY MEANS OF AN IMPROVED PRECIPITANT.

1,006,866. Specification of Letters Patent. Patented Oct. 24, 1911.

Application filed June 7, 1910. Serial No. 565,549.

*To all whom it may concern:*

Be it known that I, CHARLES W. MERRILL, a citizen of the United States, and resident of Berkeley, Alameda county, State of California, have invented a new and useful Improvement in Processes for Precipitating Hydrometallurgical Solutions by Means of an Improved Precipitant, of which the following is a specification.

My invention relates to an improved process in precipitating and recovering valuable materials from solutions and particularly metals from hydro-metallurgical solutions. I have heretofore, in Letters Patent of the United States No. 900,186, granted to me upon the 6th day of October, 1908, described and claimed a process of precipitating and recovering materials from solution, which consisted broadly in adding to the solution to be precipitated a precipitant while in motion, conducting the mixture without rest, or without contact with the atmosphere to a filter and then separating the solid from the liquid in said filter. The object of this process was primarily to precipitate and recover materials from solutions by means of the use of zinc bearing materials as precipitants under conditions which make for increased efficiency as compared with earlier processes.

Now I have discovered as a result of the practical application of the inventions referred to above, that certain zinc bearing materials which are otherwise desirable to use as precipitants, such as zinc fume or dust, are rendered less efficient and active by reason of the presence of a deterrent coating upon the surfaces of the particles thereof caused in part at least by their well-known property of oxidation. In processes as heretofore conducted, including the above No. 900,186, and particularly in the case of cyanid solutions of feeble activity, and those containing very small amounts of metal to be precipitated, the result of this is to decrease the efficiency of the precipitation because of the fact that this oxid must be dissolved during the process of precipitation before a sufficient contact of the solution and the precipitant results.

The present improvement relates, therefore, to a process of diminishing the time required in earlier processes to remove the deterrent coating formed as above stated, or in other words to remove this coating previous to the use of precipitant in the process by mechanical means.

The present improved process is conducted substantially in the same manner as the process described in the above Letters Patent and in substantially any form of apparatus applicable in said process.

In the aforesaid Letters Patent I have described a receiver which is provided for the unprecipitated solution, a receiver or mixer for the precipitant, and suitable devices for the conveyance of said solution to a filter. The precipitant may be introduced into the receiver for the unprecipitated solution by means of a suitable duct discharge to a sump at the bottom of the receiver, or it may be led to any point between said receiver, and the discharge of said filter. In any event the mixture received into the filter is there separated into solids which are retained therein and effluent liquid or filtrate which is discharged therefrom.

The type of apparatus preferably employed in conducting the process aforesaid is diagrammatically described in the accompanying sheet of drawings forming a part of this application in which—

Figure 2:
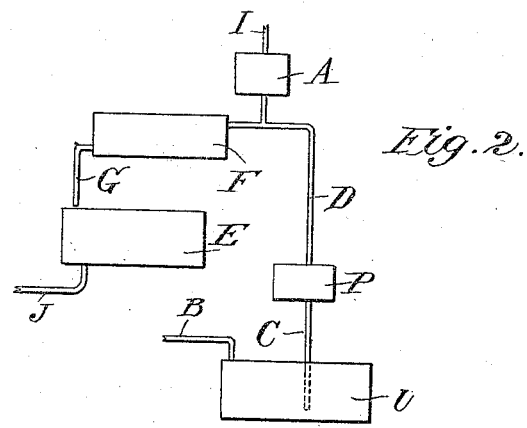

Figure 1 is a diagram showing the devices for conveying the precipitant to the solution tank, discharging directly into the tank; Fig. 2, a diagram showing the precipitant discharging into the outlet of the pump, between the pump and the filter; and Fig. 3, a diagram showing a discharge into the suction pipe of the press.

Similar letters refer to similar parts throughout the several views.

In the diagrams U is the receiver for the unprecipitated solution I is the pipe through which the precipitant and emulsifying liquid is fed, H is the duct through which the precipitant is conveyed to the unprecipitated solution in motion; C is the suction pipe of the pump; P is the pump, and D is the discharge pipe of the same; F is the filter press, shown in this case with the feed inlet at the top and is discharged at the bottom into the receiver E for the precipitated solution by means of the pipe G; J is the discharge pipe from the receiver B is the pipe through which the solution to be treated is continuously fed into the receiver U.

Figure 3:
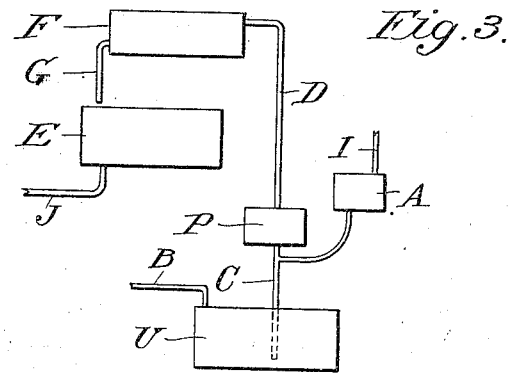

In Fig. 1, A is any suitable grinding apparatus for abrading off the deterrent coating; Fig. 2 shows the tank, or grinding apparatus A, between the pump P and the filter F; Fig. 3 shows the grinding apparatus A between the pump P and the receiver U.

For the purpose of grinding the precipitant any suitable grinding apparatus is used. The ordinary form of ball mill crusher is preferable, and if desired the cyanid solution or other liquid which is used to emulsify the precipitant may be mixed with it in the grinding apparatus.

I do not limit myself to any particular method of, or apparatus for, conducting the unprecipitated solution from the container in which the dissolution takes place, to the filter, nor do I limit myself to adding the precipitant at any particular point along the duct through which the effluent unprecipitated solution passes; nor do I limit myself to the use of the precipitant in a liquid or emulsified form, but may add it dry.

In practice, if desired, a liquid may be added to the precipitant before or after it is introduced into the receiver Z, or if an emulsion of the precipitant be used it may be fed directly into the receiver. In case the precipitant is in a dry form, if necessary, it may be reduced before the introduction into the receiver to the form of a fine powder.

I claim as my invention:

1. The process for precipitating and recovering material from solution which consists in subjecting a precipitant to mechanical treatment for the removal of any deterrent coating from the surface of the particles thereof, and precipitating the material from said solution while in motion by said precipitant, conducting the mixture without rest to a filter, and separating the solid from the liquid in said filter.

2. The process for precipitating and recovering material from solution which consists in subjecting a precipitant to mechanical treatment for the removal of any deterrent coating from the surface of the particles thereof, adding said precipitant to the duct through which said solution is being conveyed to a filter, and separating the solid from the liquid in said filter.

3. The process for precipitating and recovering material from solution which consists in conveying said solution to a pressure filter, subjecting a precipitant to mechanical treatment for the removal of any deterrent coating from the surface of the particles thereof, and subsequently forcing the precipitant into said pressure filter with said solution, and separating the solid from the liquid in said filter.

4. The process for precipitating and recovering materials from solution which consists in subjecting a precipitant to mechanical treatment for the removal of any deterrent coating from the surface of the particles thereof, adding said precipitant to the duct in which said solution is being conveyed, forcing the mixture into the top of the pressure filter, and separating the solid from the liquid in said filter.

5. The process for precipitating and recovering material from solution which consists in subjecting a precipitant to mechanical treatment for the removal of any deterrent coating from the surface of the particles thereof and adding said precipitant to a solution in motion at a point adjacent to the outlet of said solution from a receiver, forcing the mixture through a pressure filter, and separating the solid from the liquid in said filter.

6. The process for precipitating and recovering material from solution which consists in subjecting a precipitant to mechanical treatment for the removal of any deterrent coating from the surface of the particles thereof and adding said precipitant to said solution in motion, conveying the mixture to a filter, and separating the solid from the liquid in said filter, all the while excluding the mixture from contact with the atmosphere.

7. The process for precipitating and recovering material from solution which consists in subjecting a precipitant to mechanical treatment for the removal of any deterrent coating from the surface of the particles thereof and adding said precipitant to said solution in motion at a point adjacent to a suction pipe of a pump, thence conducting the mixture to the top of a pressure filter, and separating the solid from the liquid in said filter.

8. The process for precipitating and recovering material from solution which consists in subjecting a precipitant to mechanical treatment for the removal of any deterrent coating from the surface of the particles thereof, adding said precipitant to said solution in motion at a point adjacent to a suction pipe of a pump, thence conducting the mixture to the top of a pressure filter, separating the solid from the liquid in said filter, all the while excluding the mixture from contact with the atmosphere.

9. The process for precipitating and recovering metals from cyanid solutions which consists in subjecting a zinc precipitant to mechanical treatment for the removal of any deterrent coating from the surface of the particles thereof, and adding an emulsion of said zinc precipitant to said solution while in motion, conducting the mixture without rest to a filter, and separating the solid from the liquid in said filter.

10. The process for precipitating and recovering metals from cyanid solutions which consists in subjecting a zinc precipitant to mechanical treatment for the removal of any deterrent coating from the surface of the particles thereof, adding an emulsion of said zinc precipitant to said solution while in motion, conducting the mixture to a filter, and separating the solid from the liquid in said filter, all the while excluding the mixture from contact with the atmosphere.

11. The process of precipitating and recovering metals from cyanid solutions which consists in subjecting a zinc precipitant to mechanical treatment for the removal of any deterrent coating from the surface of the particles thereof and emulsifying said zinc preciptant with a liquid in a grinding apparatus, adding a liquid continuously to said grinding apparatus, discharging the emulsion from said grinding apparatus into said solution in motion, conducting the mixture without rest to a filter, and separating the solid from the liquid in said filter.

12. The process of precipitating and recovering metals from cyanid solutions which consists in subjecting a zinc precipitant to mechanical treatment for the removal of any deterrent coating from the surface of the particles thereof and emulsifying said zinc precipitant with a liquid in a grinding apparatus, adding a liquid continuously to said grinding apparatus, discharging the emulsion from said grinding apparatus into said solution in motion, conducting the mixture without rest to the top of the converging pressure filter, and separating the solid from the liquid in said filter.

13. The process for precipitating and recovering metals from cyanid solutions which consists in subjecting a metallic precipitant to mechanical treatment for the removal of any deterrent coating from the surface of the particles thereof, and subsequently adding to the solution said metallic precipitant for precipitating gold and other unprecipitated metals, conducting the mixture to a filter, and separating the solid from the liquid in said filter.

14. The process for precipitating and recovering metals from cyanid solutions which consists in subjecting a zinc precipitant to mechanical treatment for the removal of any deterrent coating from the surface of the particles thereof, and subsequently adding said zinc precipitant to said solution, conducting the mixture to a filter, and separating the solid from the liquid in said filter.

15. The process for precipitating and recovering metals from cyanid solutions which consists in subjecting a zinc precipitant to mechanical treatment for the removal of any deterrent coating from the surface of the particles thereof, and subsequently adding said zinc precipitant to said solution, conducting the mixture without rest to a filter, and separating the solid from the liquid in said filter.

16. The process for precipitating and recovering metals from cyanid solutions which consists in subjecting a zinc precipitant to mechanical treatment for the removal of any deterrent coating from the surface of the particles thereof, and subsequently adding said zinc precipitant to said solution, conducting the mixture, excluding the atmosphere therefrom to a filter, and separating the solid from the liquid in said filter.

17. The process for precipitating and recovering metals from cyanid solutions which consists in subjecting finely divided zinc to mechanical treatment for the removal of any deterrent coating from the surface of the particles thereof, adding said finely divided zinc to said solution, conducting the mixture without rest and without contact with the atmosphere to a filter, and separating the solid from the liquid in said filter.

18. The process for precipitating and recovering materials from cyanid solutions which consists in the mechanical abrasion of zinc precipitant for the purpose of removing any coating on the particles thereof, and precipitating said solution while in motion by said abraded precipitant.

19. The process for precipitating and recovering materials from cyanid solutions which consists in grinding a finely divided zinc precipitant and a liquid in a suitable grinding apparatus, precipitating the materials from said solution while in motion by said precipitant, conducting the mixture without rest to a filter and separating the solid from the liquid in said filter.

20. The process for precipitating and recovering materials from cyanid solutions which consists in grinding a finely divided zinc precipitant and a liquid in a suitable grinding apparatus, adding the emulsion so obtained at a point adjacent to the outlet of said solution from a receiver, conducting the mixture without rest to a filter, and separating the solid from the liquid in said filter.

In testimony, that I claim the foregoing as my invention, I have signed my name in presence of two witnesses, this third day of June 1910.

CHARLES W. MERRILL.

Witnesses:
WILLARD PARKER BUTLER,
CHARLES ENGEL.